United States Patent
Yoon et al.

(10) Patent No.: US 12,417,012 B2
(45) Date of Patent: *Sep. 16, 2025

(54) ELECTRONIC DEVICE SUPPORTING MULTIPLE WINDOWS AND METHOD OF CONTROLLING THE SAME

(71) Applicant: Samsung Electronics Co., Ltd., Suwon-si (KR)

(72) Inventors: Kwangbae Yoon, Suwon-si (KR); Youngjoon Yang, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,747

(22) Filed: Dec. 1, 2023

(65) Prior Publication Data

US 2024/0111412 A1     Apr. 4, 2024

Related U.S. Application Data

(63) Continuation of application No. 17/884,942, filed on Aug. 10, 2022, now Pat. No. 11,853,541, which is a
(Continued)

(30) Foreign Application Priority Data

Aug. 10, 2021  (KR) ........................ 10-2021-0105587

(51) Int. Cl.
*G06F 3/0486*      (2013.01)
*G06F 3/0482*      (2013.01)
*G06F 3/04886*     (2022.01)

(52) U.S. Cl.
CPC ......... *G06F 3/0486* (2013.01); *G06F 3/0482* (2013.01); *G06F 3/04886* (2013.01); *G06F 2203/04803* (2013.01)

(58) Field of Classification Search
CPC ......... G06F 3/0482; G06F 2203/04803; G06F 3/04883; G06F 3/0481; G06F 3/04886;
(Continued)

(56) References Cited

U.S. PATENT DOCUMENTS

2013/0187962 A1 * 7/2013 Vieri ........................ G09G 3/20
                                                        345/698
2013/0234997 A1 * 9/2013 Miyokawa .......... G06F 3/04883
                                                        345/178
(Continued)

FOREIGN PATENT DOCUMENTS

CN            106325687 A      1/2017
KR       10-2015-0024078 A     3/2015
(Continued)

OTHER PUBLICATIONS

International Search Report dated Nov. 8, 2022, issued in International Patent Application No. PCTKR2022/011807.
(Continued)

*Primary Examiner* — Rayeez R Chowdhury
(74) *Attorney, Agent, or Firm* — Jefferson IP Law, LLP

(57) ABSTRACT

An electronic device is provided. The electronic device includes a touch screen and at least one processor operatively coupled to the touch screen. The at least one processor is configured to display an execution screen of a first application on the touch screen, based on receiving a drag input for one of a plurality of pieces of content included in the execution screen of the first application, identify whether the drag input moves to a preset area, based on the drag input moving to the preset area, identify a second application
(Continued)

related to a property of the one piece of content, based on receiving a drop input after the drag input, divide the touch screen based on a position at which the drop input is received, display the execution screen of the first application in a first divided area, and display an execution screen of the second application in a second divided area.

20 Claims, 13 Drawing Sheets

Related U.S. Application Data continuation of application No. PCT/KR2022/011807, filed on Aug. 9, 2022.

(58) Field of Classification Search
CPC .... G06F 9/451; G06F 3/04817; G06F 3/0488; G06F 3/04842; G06F 3/0486; G06F 3/04845; G06F 3/017; G06F 3/0483; G06F 3/0485; G06F 1/1677; G06F 2200/1614; G06F 2203/0381; G06F 2203/04808; G06F 3/167; G06F 1/1652; G06F 1/3265; G06F 3/0484; G06F 3/04847; G06F 3/14; G06F 16/24578; G06F 16/248; G06F 16/332; G06F 18/24323; G06F 3/013; G06F 3/03545; G06F 40/274; G06F 9/453; G06F 3/1423; G06F 3/1454; G06F 1/1624; G06F 11/08; G06F 16/116; G06F 16/957; G06F 18/214; G06F 2203/04804; G06F 3/0489
See application file for complete search history.

(56) References Cited

U.S. PATENT DOCUMENTS

| 2015/0009125 | A1 | 1/2015 | Kim et al. |
| 2015/0234579 | A1 | 8/2015 | Ho |
| 2015/0309704 | A1* | 10/2015 | Bae ................. G06F 3/04883 715/765 |
| 2016/0048298 | A1* | 2/2016 | Choi ................. G06Q 30/0641 715/846 |
| 2016/0048320 | A1* | 2/2016 | Han ................. G06F 3/04883 715/765 |
| 2016/0062639 | A1 | 3/2016 | Hwang et al. |
| 2017/0212607 | A1 | 7/2017 | Yoon |
| 2018/0217727 | A1 | 8/2018 | Girard et al. |
| 2018/0329550 | A1* | 11/2018 | Dellinger ............ G06F 3/016 |
| 2021/0231506 | A1* | 7/2021 | Yu ..................... G01K 1/02 |
| 2022/0050582 | A1* | 2/2022 | Zhou ................. G06F 3/0485 |
| 2022/0215815 | A1 | 7/2022 | Kim et al. |
| 2022/0357845 | A1* | 11/2022 | Luo ................... G06F 3/0486 |

FOREIGN PATENT DOCUMENTS

| KR | 10-2015-0124311 A | 11/2015 |
| KR | 10-2016-0020166 A | 2/2016 |
| KR | 10-2016-0021637 A | 2/2016 |
| KR | 10-2016-0025905 A | 3/2016 |
| KR | 10-1615983 B1 | 4/2016 |
| KR | 10-2019-0142362 A | 12/2019 |
| KR | 10-2021-0035447 A | 4/2021 |
| WO | 2021/063074 A1 | 4/2021 |

OTHER PUBLICATIONS

Extended European Search report dated Aug. 28, 2024, issued in European Application No. 22856155.1-1218.

* cited by examiner

ELECTRONIC DEVICE SUPPORTING MULTIPLE WINDOWS AND METHOD OF CONTROLLING THE SAME

CROSS-REFERENCE TO RELATED APPLICATION(S)

This application is a continuation application of prior application Ser. No. 17/884,942, filed on Aug. 10, 2022, which was based on and claimed priority under § 365(c), of an International application No. PCT/KR2022/011807, filed on Aug. 9, 2022, which is based on and claims the benefit of a Korean patent application number 10-2021-0105587, filed on Aug. 10, 2021, in the Korean Intellectual Property Office, the disclosure of which is incorporated by reference herein in its entirety.

TECHNICAL FIELD

The disclosure relates to an electronic device supporting multiple windows and a method of controlling the same.

BACKGROUND ART

As electronic devices have been equipped with various functions over the recent years, they offer various conveniences to users through various applications.

As such, a plurality of applications are available in an electronic device, which increases the importance of a technology of supporting interaction between executed applications.

Accordingly, when executing a plurality of applications, the electronic device supports a multi-window function to display execution screens of the plurality of applications together through screen divide or pop-up.

The above information is presented as background information only to assist with an understanding of the disclosure. No determination has been made, and no assertion is made, as to whether any of the above might be applicable as prior art with regard to the disclosure.

DISCLOSURE

Technical Problem

Conventionally, when content is selected on an application screen, a new screen is displayed for the content. For example, when the content is a link, a web page for the selected link is displayed on a new screen, and when the content is an image, an image is displayed on a new screen.

In this case, a user should inconveniently go back to the previous screen or close the new screen to see the previous screen.

Moreover, to activate an existing multi-window function, the user needs to apply a user input for activating the multi-window function and directly select an application to be displayed on each screen.

Therefore, to display application screens related to content of an existing application screen in a multi-window manner, the user should apply a user input for activating the multi-window function, identify an application related to the content, and select the applications directly, which is annoying to the user.

Aspects of the disclosure are to address at least the above-mentioned problems and/or disadvantages and to provide at least the advantages described below. Accordingly, an aspect of the disclosure is to provide an electronic device that displays an execution screen of an application related to content included in an application execution screen in a multi-window manner simply by a user input for the content, and a method of controlling the same.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a touch screen and at least one processor operatively coupled to the touch screen. The at least one processor is configured to display an execution screen of a first application on the touch screen, based on receiving a drag input for one of a plurality of pieces of content included in the execution screen of the first application, identify whether the drag input moves to a preset area, when the drag input moves to the preset area, identify a second application related to a property of the one piece of content, based on receiving a drop input after the drag input, divide the touch screen based on a position at which the drop input is received, display the execution screen of the first application in a first divided area, and display an execution screen of the second application in a second divided area.

In accordance with another aspect of the disclosure, a method of controlling an electronic device is provided. The method includes displaying an execution screen of a first application on a touch screen, based on receiving a drag input for one of a plurality of pieces of content included in the execution screen of the first application, identifying whether the drag input moves to a preset area, when the drag input moves to the preset area, identifying a second application related to a property of the one piece of content, based on receiving a drop input after the drag input, dividing the touch screen based on a position at which the drop input is received, displaying the execution screen of the first application in a first divided area, and displaying an execution screen of the second application in a second divided area.

Advantageous Effects

According to various embodiments of the disclosure, an execution screen of an application related to content may be displayed in a multi-window manner simply by a drag-and-drop input for the content.

Further, according to various embodiments of the disclosure, as a plurality of applications related to content included in an application screen are provided, a most suitable application may be selected.

Further, according to various embodiments of the disclosure, even though a multi-window function is activated unintentionally by a dag input, the multi-window function may be cancelled by a user input for the cancellation, before execution of the multi-window function.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
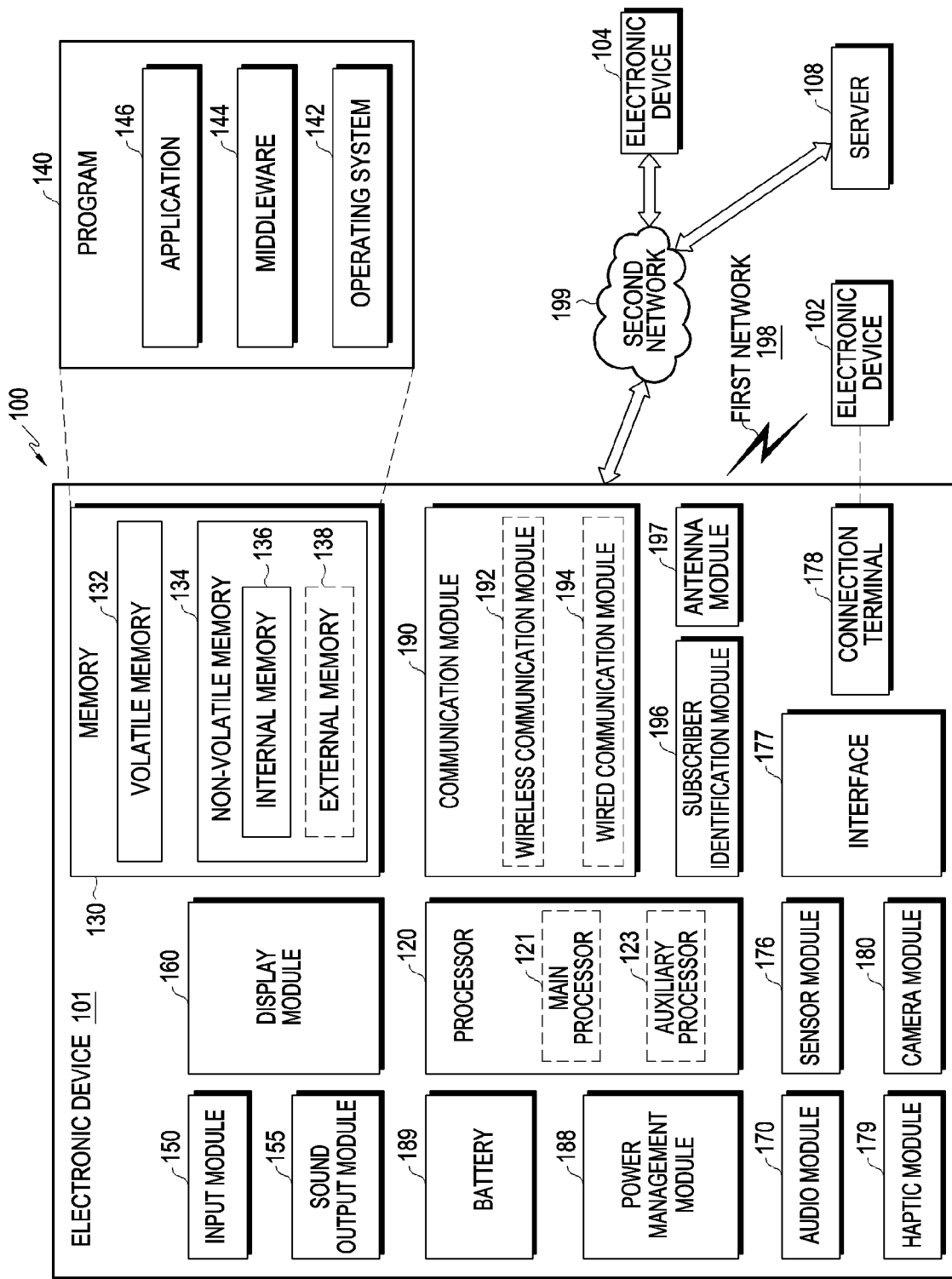
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
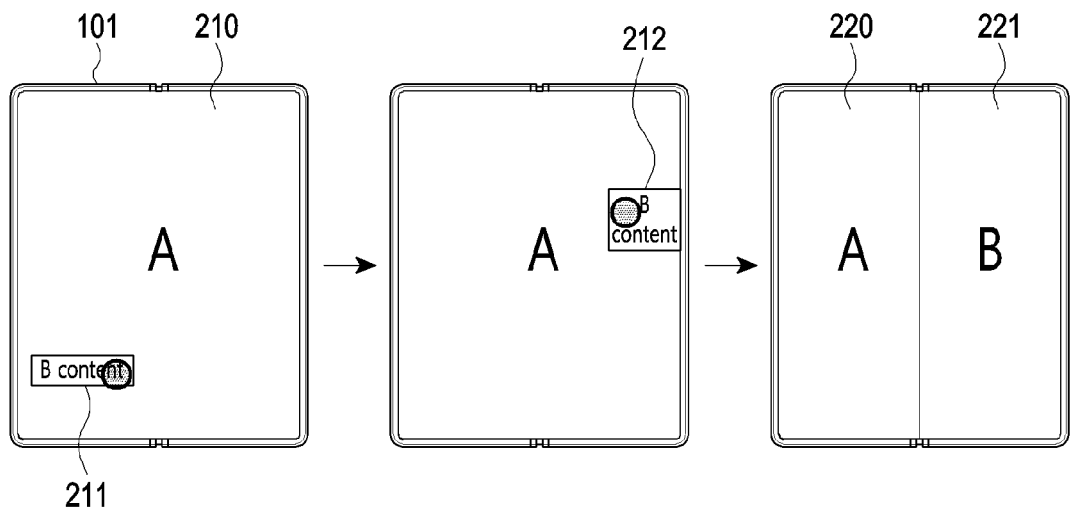
FIG. 2A is a diagram illustrating a multi-window operation based on a drag-and-drop input in an electronic device according to an embodiment of the disclosure.

FIG. 2A is a diagram illustrating a multi-window operation based on a drag-and-drop input in an electronic device according to an embodiment of the disclosure.

Figure 2B:
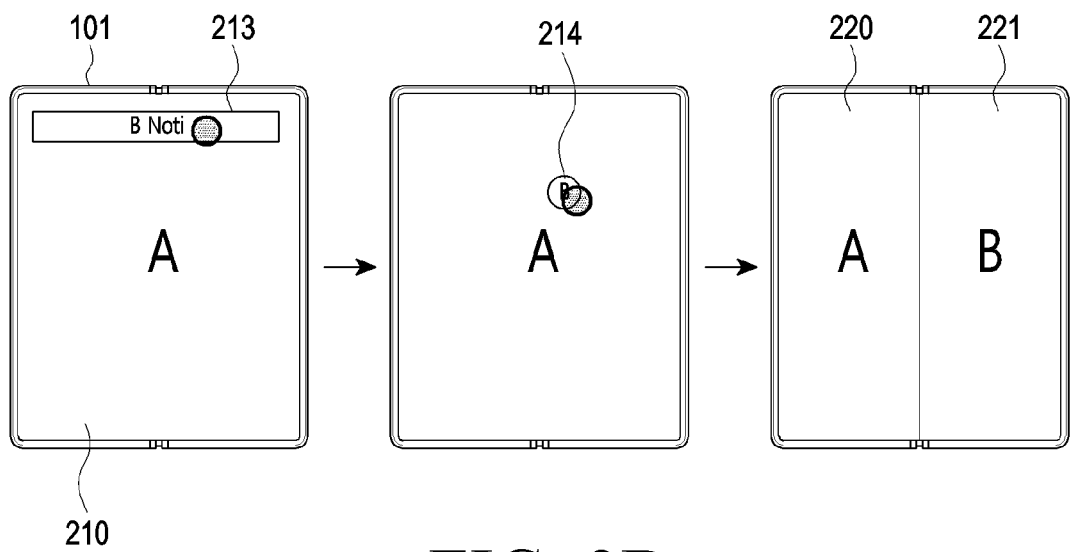
FIG. 2B is a diagram illustrating a multi-window operation based on a drag-and-drop input in an electronic device according to an embodiment of the disclosure.

FIG. 2B is a diagram illustrating a multi-window operation based on a drag-and-drop input in an electronic device according to an embodiment of the disclosure.

Referring to FIG. 2A, an electronic device (e.g., the electronic device 101 of FIG. 1 or the processor 120 of FIG. 1) may display an execution screen 210 of a first application. According to an embodiment, the electronic device 101 may receive a selection of content 211 included in the execution screen 210 of the first application. For example, the selection may be a touch or a long touch.

According to an embodiment, the content 211 included in the execution screen 210 of the first application may be an image, video, or text included in the execution screen 210 of the first application.

Referring to FIG. 2B, according to an embodiment, content 213 included in the execution screen 210 of the first application may be text in an address window included in the execution screen 210 of the first application.

According to an embodiment, when the content 211 is selected and dragged to a specific area on the execution screen 210 of the first application, the electronic device 101 may activate a multi-window function. According to an embodiment, activating a multi-window function may include identifying a divided area and identifying an application related to the selected content 211.

For example, when the content 211 is selected and then dragged to an edge area 212, the electronic device 101 may activate the multi-window function, as illustrated in FIG. 2A. According to an embodiment, when content 213 is selected, the electronic device 101 may display a user interface (UI) for activating the multi-window function, and when the selected content 213 is dragged to an area 214 for activating the multi-window function, activate the multi-window function, as illustrated in FIG. 2B.

According to an embodiment, when the content 211 and 213 is dragged to a specific area and then dropped, the electronic device 101 may divide the screen based on a dropped position, display the execution screen of the first application in a first divided area 220 among a plurality of divided areas, and display an execution screen of a second application related to the content 211 and 213 in a second divided area 221. While the screen is shown as being divided into left and right areas in FIGS. 2A and 2B, the disclosure is not limited to the left and right division.

Referring to FIGS. 3, 4, 5A, 5B, 6 to 11, 12A, and 12B, an operation of identifying an application related to selected content and a screen dividing operation will be described below in detail.

Figure 3:
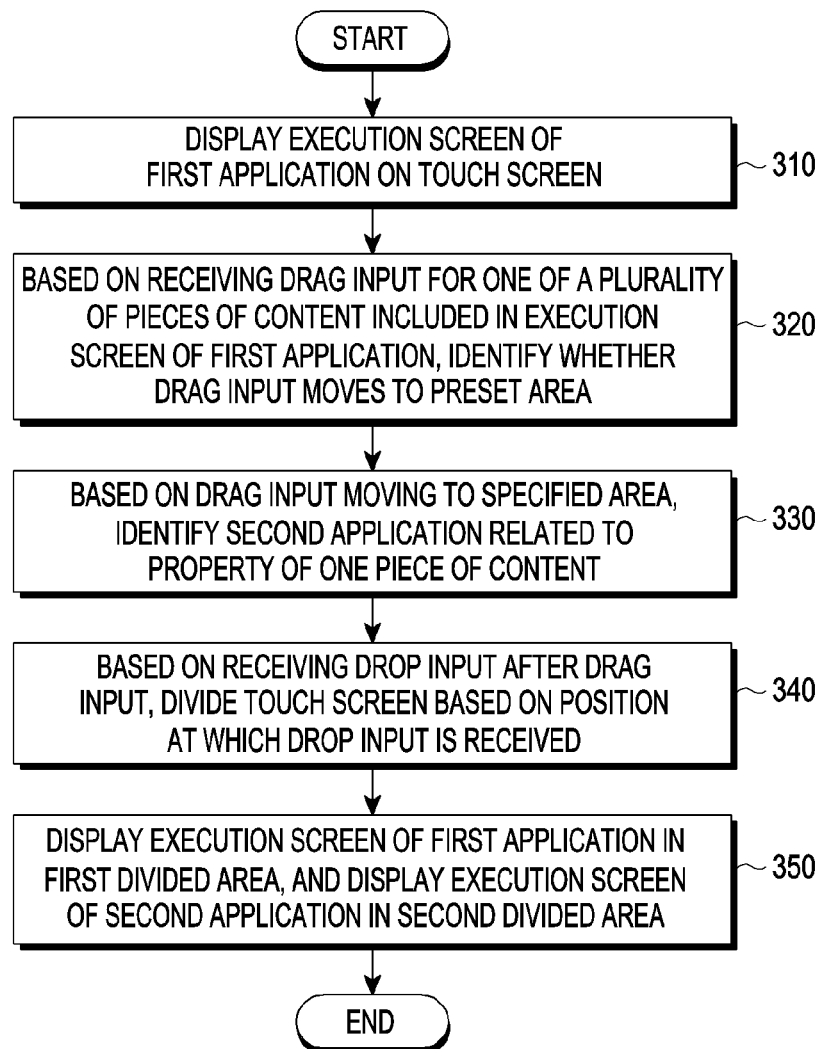
FIG. 3 is a flowchart illustrating a multi-window operation based on a drag-and-drop input in an electronic device according to an embodiment of the disclosure.

FIG. 3 is a flowchart illustrating a multi-window operation based on a drag-and-drop input in an electronic device according to an embodiment of the disclosure.

Referring to FIG. 3, in operation 310, an electronic device (e.g., the electronic device 101 of FIG. 1 or the processor 120 of FIG. 1) may display an execution screen of a first application on a touch screen (e.g., the display module 160 of FIG. 1).

For example, the electronic device may display the execution screen of the first application in a full screen on the touch screen based on a user input that selects an icon representing the first application.

According to an embodiment, in operation 320, based on receiving a drag input for one piece of content among a plurality of pieces of content included in the execution screen of the first application, the electronic device may identify whether the drag input has moved to a preset area.

Figure 4:
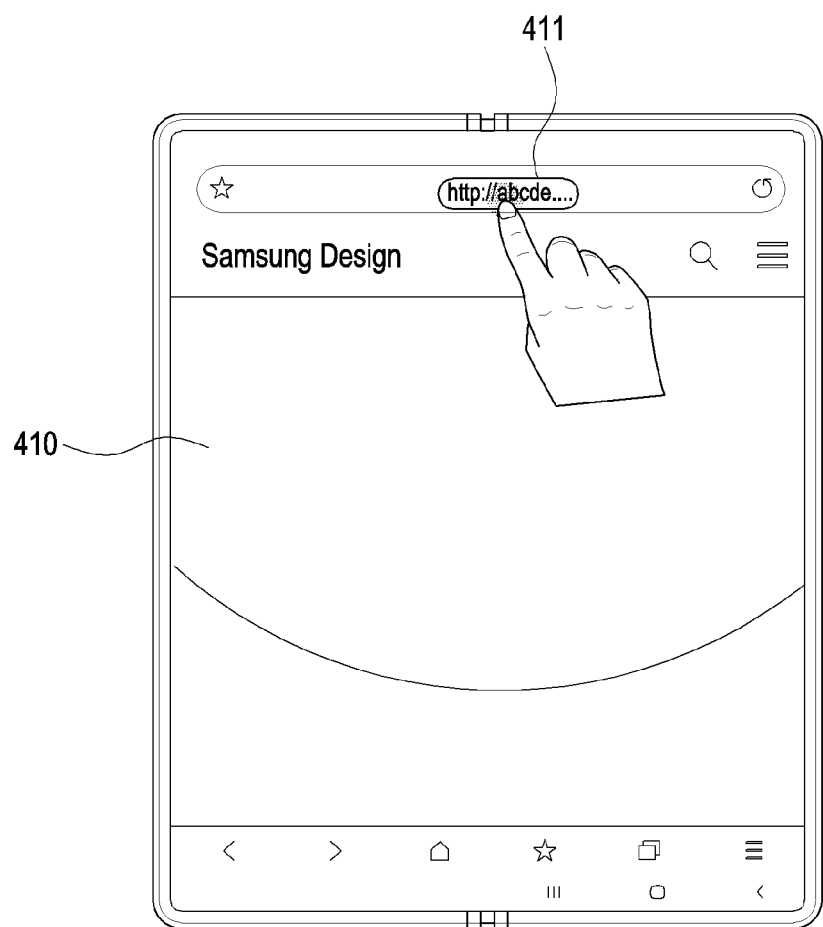
FIG. 4 is a diagram illustrating an operation of selecting content on an execution screen of a first application according to an embodiment of the disclosure.

According to an embodiment, the electronic device may select one of the plurality of pieces of content included in the execution screen of the first application through a touch or a long touch, as illustrated in FIG. 4.

FIG. 4 is a diagram illustrating an operation of selecting content on an execution screen of a first application according to an embodiment of the disclosure.

Referring to FIG. 4, an electronic device (e.g., the electronic device 101 of FIG. 1 or the processor 120 of FIG. 1) may display an execution screen 410 of a first application on the touch screen (e.g., the display module 160 of FIG. 1). According to an embodiment, while the execution screen 410 of the first application is shown as a browser screen in FIG. 4, the disclosure is not limited thereto.

According to an embodiment, the electronic device may receive a selection on one piece of content 411 from among a plurality of pieces of content included in the execution screen 410 of the first application. For example, the content selection may be a touch or a long touch. According to an embodiment, in the case where another function is already mapped to the long touch, when the long touch is maintained for a preset time (e.g., 750 ms) after being recognized, the electronic device may identify that a user input for selecting the one piece of content 411 has been received. While the selected one piece of content 411 is shown as text in an address window in FIG. 4, the one piece of content 411 may also be text, an image, or a video included in the execution screen 410 of the first application.

According to an embodiment, the electronic device may identify whether a drag input is received after the one piece of content 411 is selected through the touch or the long touch. For example, after receiving the touch or the long touch on the one piece of content 411, the electronic device may identify whether a drag input is received immediately without a release action that terminates the touch.

According to an embodiment, based on receiving a drag input for the one piece of content 411, the electronic device may identify whether the first application supports a drag input (or drag-and-drop input) for content. According to an embodiment, before receiving the drag input for the one piece of content 411, the electronic device may identify whether a drag input (or drag-and-drop input) for content is supported in operation 310 in which the execution screen of the first application is displayed. According to an embodiment, when the first application does not support a drag input (or drag-and-drop input), the electronic device may not perform any separate operation in spite of reception of the drag input for the one piece of content 411.

Referring back to FIG. 3, based on receiving the drag input for the one piece of content 411, the electronic device may identify whether the first application supports a multi-window function. For example, the electronic device may identify whether the first application supports at least one multi-window function of screen dividing, pop-up, or freeform.

According to an embodiment, the first application may have metadata as described in Table 1 below.

TABLE 1

| Name | Value | Description |
| --- | --- | --- |
| android: defaultWidth | int | Default size when activity is made in Freeform |
| android: defaultHeight | (dp unit, e.g., "100") | |
| android: minWidth | int | Minimum size available for activity when activity is made in MultiWindow |
| android: minHeight | (dp unit, e.g., "100") | |
| android: resizeableActivity | boolean | Indicate whether application or activity supports MultiWindow |
| android: supportsPictureInPicture | boolean | Indicates whether activity supports picture in picture (PIP) |

According to an embodiment, the electronic device may identify whether the multi-window function is supported based on state information about the electronic device. For example, when the electronic device is in a specific mode (e.g., kids' mode, save mode, emergency mode, or mobile keyboard), the electronic device may identify that the multi-window function is not supported.

According to an embodiment, it may be identified whether the multi-window function is supported based on a heating state of the electronic device or a charging state of the battery. For example, even though the first application supports the multi-window function, when the heat of the electronic device is equal to or greater than a preset value or the charged level of the battery is less than a preset value, the electronic device may disable the multi-window function and identify that the first application does not support the multi-window function.

Figure 5A:
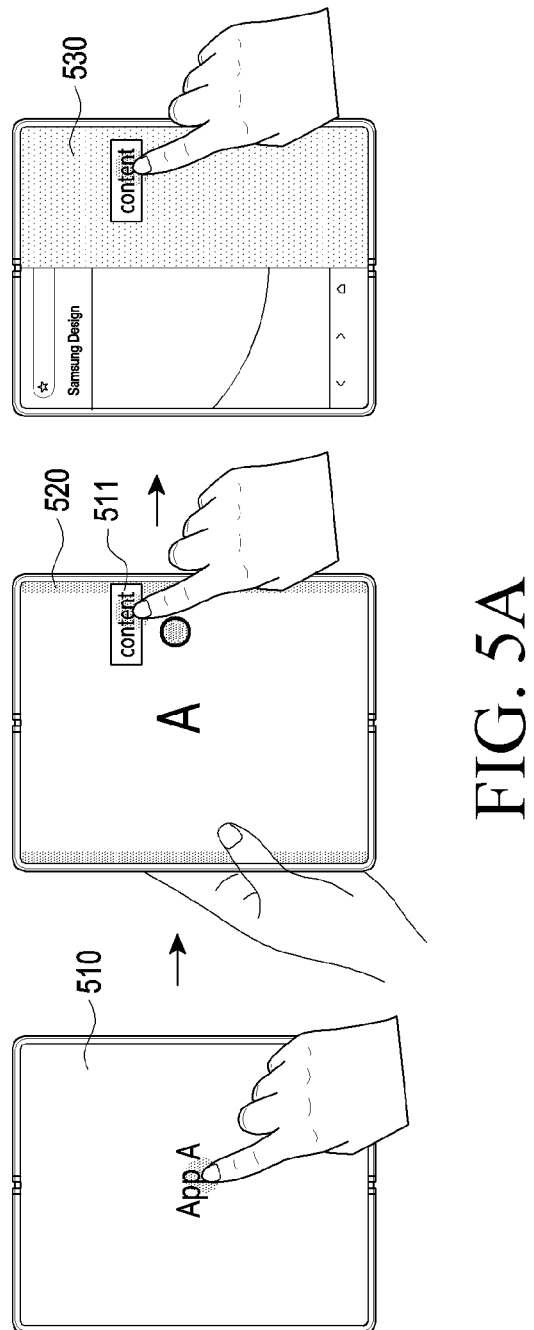
FIG. 5A is a diagram illustrating an operation of displaying a guide view for a divided area by a drag input after content is selected according to an embodiment of the disclosure.

While it has been described above that based on receiving the drag input for the content, it is identified whether the first application supports the multi-window function, based on receiving the touch or the long touch for selecting the content before the drag input, it may be identified whether the first application supports the multi-window function. According to an embodiment, when the drag input for the content has moved to a preset area, it may be identified whether the first application supports the multi-window function. For example, the preset area, which is an area for activating the multi-window function, may be an edge area of the touch screen, as illustrated in FIG. 2A or FIG. 5A, or an area where a UI for activating the multi-window function is displayed, as illustrated in FIG. 2B.

According to an embodiment, when identifying that the first application does not support the multi-window function, the electronic device may not perform any separate operation for the touch, the long touch, or the drag input for the one piece of content.

According to an embodiment, the electronic device may manage an activate setting or a disable setting for the multi-window function by a key value. For example, the electronic device may normally perform activate setting, only when the same key value as used for requesting disabling of the multi-window function is used to request activating of the multi-window function. According to an embodiment, when disabling of a plurality of multi-window functions are requested in the past, the electronic device may perform final activating setting, only when an activating request is made for all keys used for the activating requests.

According to an embodiment, in operation 330, based on the drag input moving to the preset area, the electronic device may identify a second application related to a property of the one piece of content. For example, the preset area, which is an area for activating the multi-window function, may be an edge of the touch screen or an area where a UI for activating the multi-window function is displayed.

According to an embodiment, when the coordinates of the drag input is changed to the coordinates of the preset area, the electronic device may identify that the user intends to use the multi-window function and execute the multi-window function.

According to an embodiment, when the drag input moves to the preset area and then stays in the area for a preset time, the electronic device may identify that the user intends to use the multi-window function and execute the multi-window function.

According to an embodiment, when the drag input moves to the preset area and then leaves the preset area, the electronic device may provide a feedback (e.g., a vibration feedback or highlight). For example, when the drag input moves to the edge of the touch screen or the displayed UI area, which is a preset area for activating the multi-window function, and then leaves the preset area within a preset time, the electronic device may provide a feedback to induce the user to move the drag input back to the preset area. According to an embodiment, in the case of the preset area where the UI for activating the multi-window function is configured, when the drag input moves to the preset area and leaves the preset area within a preset time, the electronic device may maintain the UI displayed while providing a feedback.

According to an embodiment, an operation of executing a multi-window function according to a user's drag input will be described below with reference to FIG. 5A.

According to an embodiment, when the multi-window function is supported, the electronic device may identify a property of the one piece of selected content.

According to an embodiment, the electronic device may identify the property of the selected content by identifying whether the type of the selected content is a multimedia file or text. According to an embodiment, the multimedia file may be in the form of a uniform resource identifier (URI) and include an image, video, or audio. According to an embodiment, the text may include simple text, text in a hypertext markup language (HTML) format, or text having a format such as a phone number, an email address, a web address uniform resource locator (URL), or a date.

According to an embodiment, when the type of the content selected on the execution screen of the first application is text, the electronic device may identify the property of the selected content by further performing text analysis. For example, when the selected content is text, the electronic device may identify whether the text is simple text, a phone number, an email address, a web address (URL), or a date through text analysis.

According to an embodiment, the electronic device may identify a second application that is highly related to the property of the selected content. According to an embodiment, the second application highly related to the property of the content may mean a second application for executing or inputting the selected content based on the property of the selected content. For example, executing the content means playing or displaying the content, and inputting the content may mean inputting the content into a text input window included in the application.

According to an embodiment, the second application related to the property of the content will be described with reference to Table 2 below.

TABLE 2

| | Content type | Connection | Detail |
|---|---|---|---|
| Text-based | Phone number | App chooser | (Contact/Message/Phone, etc.) in chooser |
| | Email address | App chooser | (Contact, Gmail, Outlook, etc.) in chooser |
| | URL | .Default app .App chooser | When default app is set, directly execute corresponding app |
| | Date | App chooser | (Outlook, Calendar, etc.) in chooser |
| | Address | | Google map |
| Text-based | Plain text | App chooser | (Note, Internet browsing) in chooser |

TABLE 2-continued

| | Content type | Connection | Detail |
|---|---|---|---|
| Text-based | URI (Image) | App chooser | Image view app (Gallery, Photos, etc.) in chooser |
| | URI (Video) | App chooser | Video view app in chooser |
| | URI (Audio) | App chooser | Video view app in chooser |

According to an embodiment, referring to Table 2, when the content is a phone number, a contact application, a message application, or a call application may be identified as the second application. According to an embodiment, when the content is an email address, a contact application or a mail application may be identified as the second application. According to an embodiment, when the content is a web address (URL), a web browser is identified as the second application, and the execution screen of the second application may be a browser screen at the web address. According to an embodiment, when the content is a date, a mail application or a calendar application may be identified as the second application. According to an embodiment, when the content is an address, a map application or a contact application may be identified as the second application.

According to an embodiment, when the content is plain text, the electronic device may identify that there is no related application and identify a predetermined application as the second application. For example, in the absence of any application related to the selected content, the electronic device may identify one of a search application and a memo application as the second application.

According to an embodiment, one or more second applications related to the selected content may be identified.

According to an embodiment, the second application may be different from or identical to the first application.

According to an embodiment, in operation 340, based on receiving a drop input after the drag input, the electronic device may divide the touch screen based on a position at which the drop input has been received. For example, the electronic device may divide the touch screen such that the execution screen of the second application is displayed in an area including the position at which the drop input has been received. According to an embodiment, the electronic device may divide the touch screen left and right, up and down, or in a pop-up form according to the position of the drop input. The screen dividing operation based on the position of a drop input according to an embodiment will be described below in more detail with reference to FIG. 7.

According to an embodiment, the electronic device may display a guide view for a second divided area based on the drag input, after the drag input is moved to the preset area. For example, when identifying that that the user intends to activate the multi-window function based on the movement of the drag input to the preset area, the electronic device may display a guide view to indicate the second divided area in which the execution screen of the second application will be displayed to the user. The operation of providing a guide view according to an embodiment will be described below in more detail with reference to FIGS. 5A, 7, and 8.

According to an embodiment, based on receiving a user input preset for canceling the drag input after the drag input moves to the preset area for activating the multi-window function, the operation based on the drag input may be terminated. For example, the electronic device may display a UI for cancellation after activating the multi-window function, and when the drag input moves to the UI for cancellation and the electronic device receives a drop input, the operation based on the drag input may be terminated. For example, when the drag input moves to the UI for cancellation and the drop input is received, the electronic device may cancel the drag input and the operation of activating the multi-window function. The drag input cancellation operation according to an embodiment will be described below in more detail with reference to FIG. 7.

According to an embodiment, in operation 350, the electronic device may display the execution screen of the first application in a first divided area, and the execution screen of the second application in a second divided area.

According to an embodiment, the electronic device may display the guide view according to the drag input, and, based on receiving the drop input, divide the screen such that an area in which the guide view is displayed becomes the second divided area, and display the execution screen of the first application in the first divided area and the execution screen of the second application in the second divided area.

According to an embodiment, when identifying a plurality of second applications related to the property of the selected content, the electronic device may display a list including the plurality of second applications in the second divided area.

According to an embodiment, upon selection of one second application from the list, the electronic device may display an execution screen of the selected second application in the second divided area. The operation of displaying a list including a plurality of second applications according to an embodiment will be described below with reference to FIG. 6.

According to an embodiment, the electronic device may execute a multi-window function to include three or more divided areas through a drag-and-drop input.

According to an embodiment, based on receiving a second drag input for one piece of second content among a plurality of pieces of second content included in the execution screen of the second application, the electronic device may identify whether the second drag input has moved to a second preset area. Since this operation is the same as operation 320, a redundant description will be avoided herein.

According to an embodiment, when the second drag input moves to the second preset area, a third application related to a property of the one piece of second content may be identified. Since this operation is the same as operation 330, a redundant description will be avoided herein.

According to an embodiment, based on receiving a second drop input after the second drag input, the electronic device may divide the second divided area into a third divided area and a fourth divided area, based on a position at which the second drop input has been received. According to an embodiment, the electronic device may divide the first divided area into the third divided area and the fourth divided area based on the position at which the second drop input has been received.

According to an embodiment, the electronic device may display the execution screen of the second application in the third divided area, and an execution screen of the third application in the fourth divided area. According to an embodiment, when identifying a plurality of third applications, the electronic device may display a list including the plurality of third applications in the fourth divided area. According to an embodiment, upon selection of one third application from the list, the electronic device may display an execution screen of the selected third application in the fourth divided area. The multi-window operation including three or more divided areas according to an embodiment will be described below with reference to FIGS. 9 and 10.

According to an embodiment, while the electronic device has been described above as a bar type or a tablet type, when the electronic device is a foldable device, the electronic device may perform the multi-window function in further consideration of the hinge angle of the foldable device. According to an embodiment, a multi-window operation in an electronic device which is a foldable device will be described below in more detail with reference to FIG. 11.

According to an embodiment, when the electronic device is a slidable device, the electronic device may perform the multi-window function in consideration of the grip shape of a hand holding the electronic device. According to an embodiment, the multi-window operation in an electronic device which is a slidable device will be described below in more detail with reference to FIGS. 12A and 12B.

FIG. 5A is a diagram an operation of displaying a guide view for a divided area through a drag input after content is selected according to an embodiment of the disclosure.

Referring to FIG. 5A, an electronic device (e.g., the electronic device 101 of FIG. 1 or the processor 120 of FIG. 1) may display an execution screen 510 of a first application.

According to an embodiment, the electronic device may receive a drag input that selects content 511 included in the execution screen 510 of the first application and drags the selected content 511 to a preset area 520. For example, the preset area 520 may be an edge of the touch screen (e.g., the display module 160 of FIG. 1), and the electronic device may receive a user input that selects the content 511 included in the execution screen 510 of the first application and drags the selected content 511 to the edge of the touch screen (e.g. the display module 160 of FIG. 1). According to an embodiment, when the drag input for the content 511 included in the execution screen 510 of the first application is started, the electronic device may highlight the edge of the touch screen to indicate to the user that the preset area 520 for activating the multi-window function is the edge of the touch screen.

According to an embodiment, the preset area may be a UI displayed for activating the multi-window function, and the electronic device may receive a user input that selects the content 511 included in the execution screen 510 of the first application and drags the selected content 511 to the UI for activating the multi-window function.

According to an embodiment, when the content 511 included in the execution screen 510 of the first application is selected through a touch or a long touch, a content image corresponding to the content 511 may be displayed in a touched or long-touched area. When the drag input is started, the electronic device may display the content image such that the content image moves according to the drag input.

Figure 5B:
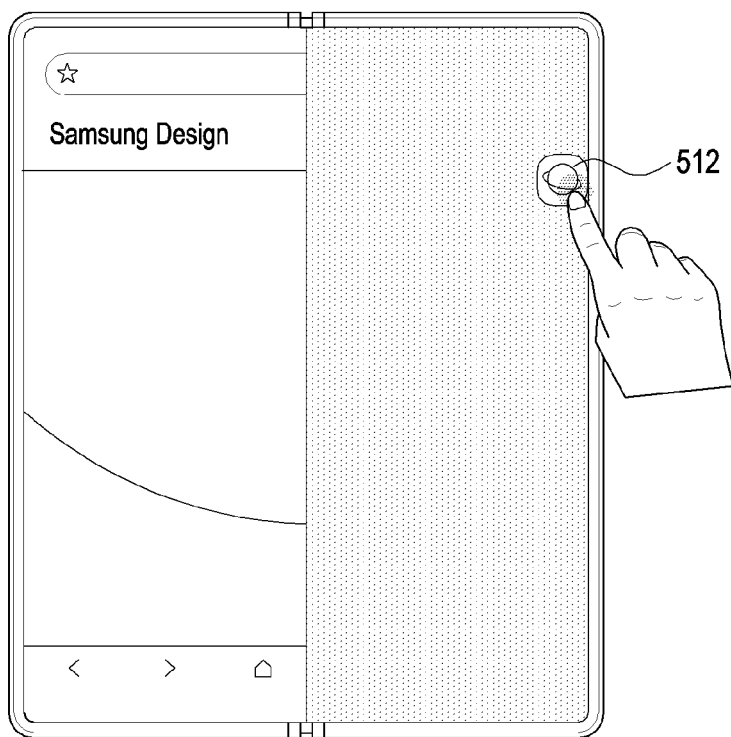
FIG. 5B is a diagram illustrating an operation of displaying a guide view for a divided area by a drag input after content is selected according to an embodiment of the disclosure.

FIG. 5B is a diagram illustrating an operation of displaying a guide view for a divided area through a drag input after content is selected according to an embodiment of the disclosure.

Referring to FIG. 5B, upon selection of content included in an execution screen of a first application through a touch or a long touch, the electronic device may display an icon image 512 of a second application related to the content in a touched or long-touched area. When a drag input is started, the electronic device may display the icon image 512 of the second application such that the icon image 512 moves according to the drag input.

Returning to FIG. 5A, according to an embodiment, based on receiving the user input that drags the content 511 to the preset area 520, the electronic device may activate the multi-window function.

According to an embodiment, the electronic device may display an area in which an execution screen of a second application corresponding to the content 511 is to be displayed, as a guide view 530.

According to an embodiment, based on receiving a drop input with the guide view 530 displayed, the electronic device may display the execution screen of the first application in a first divided area where the guide view 530 is not displayed and the execution screen of the second application in a second slit area in which the guide view 530 is displayed.

Figure 6:
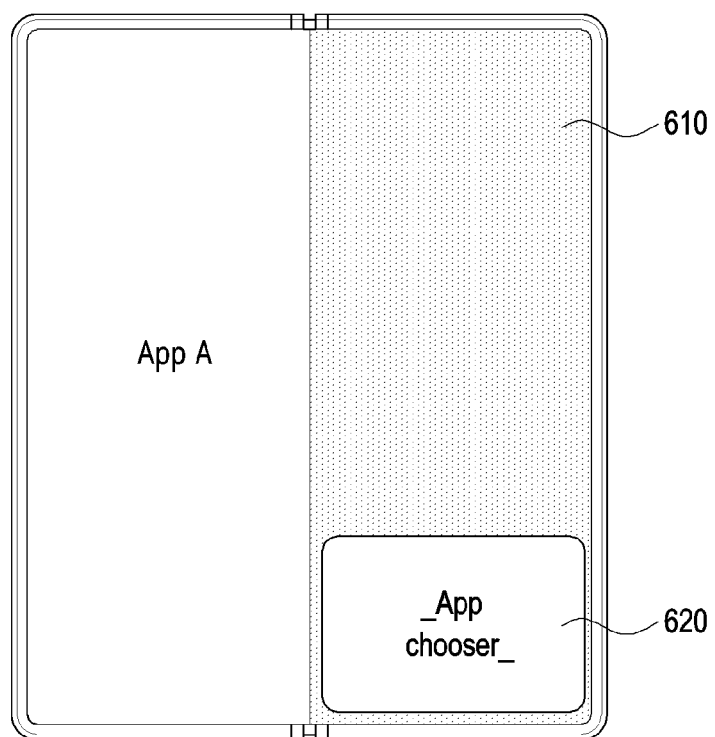
FIG. 6 is a diagram illustrating an operation in the case of a plurality of second applications related to content according to an embodiment of the disclosure.

FIG. 6 is a diagram illustrating an operation in the case of a plurality of second applications related to content according to an embodiment of the disclosure.

Referring to FIG. 6, when an electronic device (e.g., the electronic device 101 of FIG. 1 or the processor 120 of FIG. 1) receives a drop input in the case of a plurality of second applications related to content selected in a first application, the electronic device may display a list 620 (e.g., App chooser) including the plurality of second applications in a second divided area 610. According to an embodiment, the list 620 may list the names of the plurality of second applications or icon images representing the plurality of second applications.

According to an embodiment, an application that is already running in another divided area among the plurality of second applications may be maintained in the list 620 or may be deleted from the list 620. For example, when an application that is already running in another divided area among the plurality of second applications is maintained in the list 620, and the user selects the application that is already running in another divided area from the list 620, the electronic device may display an execution screen of the same application in the first divided area and the second divided area. For example, an execution screen of the first application including the content may be displayed in a first divided area, and an execution screen of the first application in which the content is executed or input may be displayed in a second divided area.

According to an embodiment, upon selection of an application from the list 620, the electronic device may provide an option for executing the selected application only once or always executing the selected application, in relation to a property of the selected content.

Figure 7:
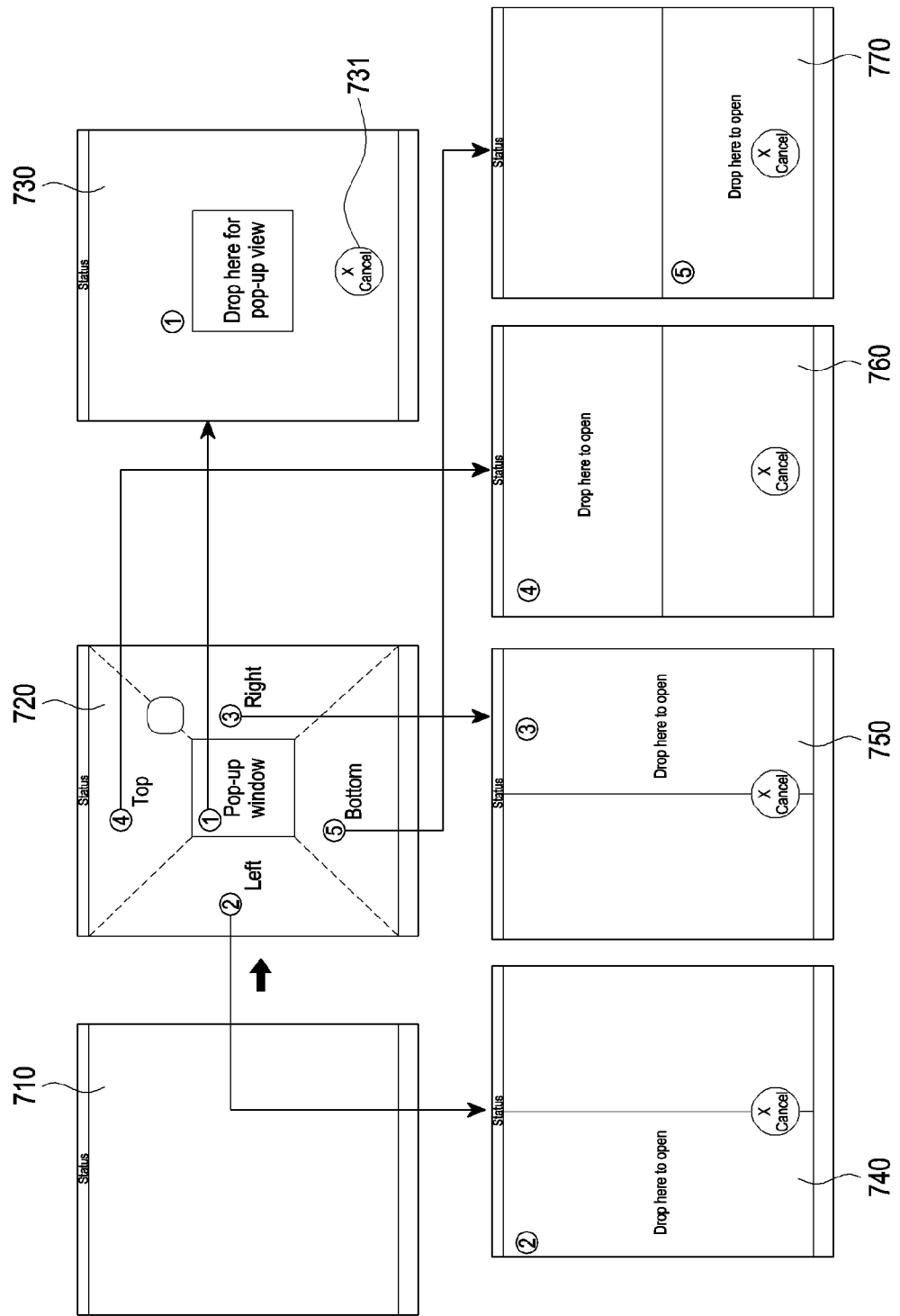
FIG. 7 is a diagram illustrating divided areas based on the positions of drop inputs according to an embodiment of the disclosure.

FIG. 7 is a diagram illustrating divided areas based on the positions of drop inputs according to an embodiment of the disclosure.

Referring to FIG. 7, an electronic device (e.g., the electronic device 101 of FIG. 1 or the processor 120 of FIG. 1) may display an execution screen 710 of a first application.

According to an embodiment, when the electronic device receives a drag input for content included in the execution screen 710 of the first application, and the drag input moves to a preset area, the electronic device may activate the multi-window function.

According to an embodiment, when the multi-window function is enabled, the electronic device may display a screen 720 providing drop positions. For example, the screen 720 providing the drop positions may include a pop-up window, a left area, a right area, a top area, and a bottom area. Although the screen is divided into five areas in FIG. 7, it may be divided into four or fewer areas or six and more areas. According to an embodiment, the electronic device may skip the operation of displaying the screen 720 providing the drop positions.

According to an embodiment, when the user's drag input moves to the pop-up window area, the electronic device may display a screen 730 that displays a second divided area in a pop-up form, as a guide view at the center of the touch screen (e.g., the display module 160 of FIG. 1). According to an embodiment, the electronic device may further display a UI 731 for canceling both the drag input and the guide view. According to an embodiment, when the drag input is moved to and then dropped on the UI 731 for canceling the drag input, the electronic device may cancel both the drag input and the operation of activating the multi-window function and display the execution screen 710 of the first application.

According to an embodiment, when the drag input of the user is moved to the left area, the electronic device may divide the touch screen into the left and right areas and display a screen 740 displaying the left divided area as a guide view. According to an embodiment, the electronic device may further display the UI for canceling the drag input together with the guide view.

According to an embodiment, when the user's drag input is moved to the right area, the electronic device may divide the touch screen into the left and right areas and display a screen 750 that displays the right divided area as a guide view. According to an embodiment, the electronic device may further display the UI for canceling the drag input together with the guide view.

According to an embodiment, when the user's drag input is moved to the top area, the electronic device may divide the touch screen into the top and bottom areas and display a screen 760 that displays the top divided area as a guide view. According to an embodiment, the electronic device may further display the UI for canceling the drag input together with the guide view.

According to an embodiment, when the user's drag input is moved to the bottom area, the electronic device may divide the touch screen into the top and bottom areas and display a screen 770 that displays the bottom divided area as a guide view. According to an embodiment, the electronic device may further display the UI for canceling the drag input together with the guide view.

Figure 8:
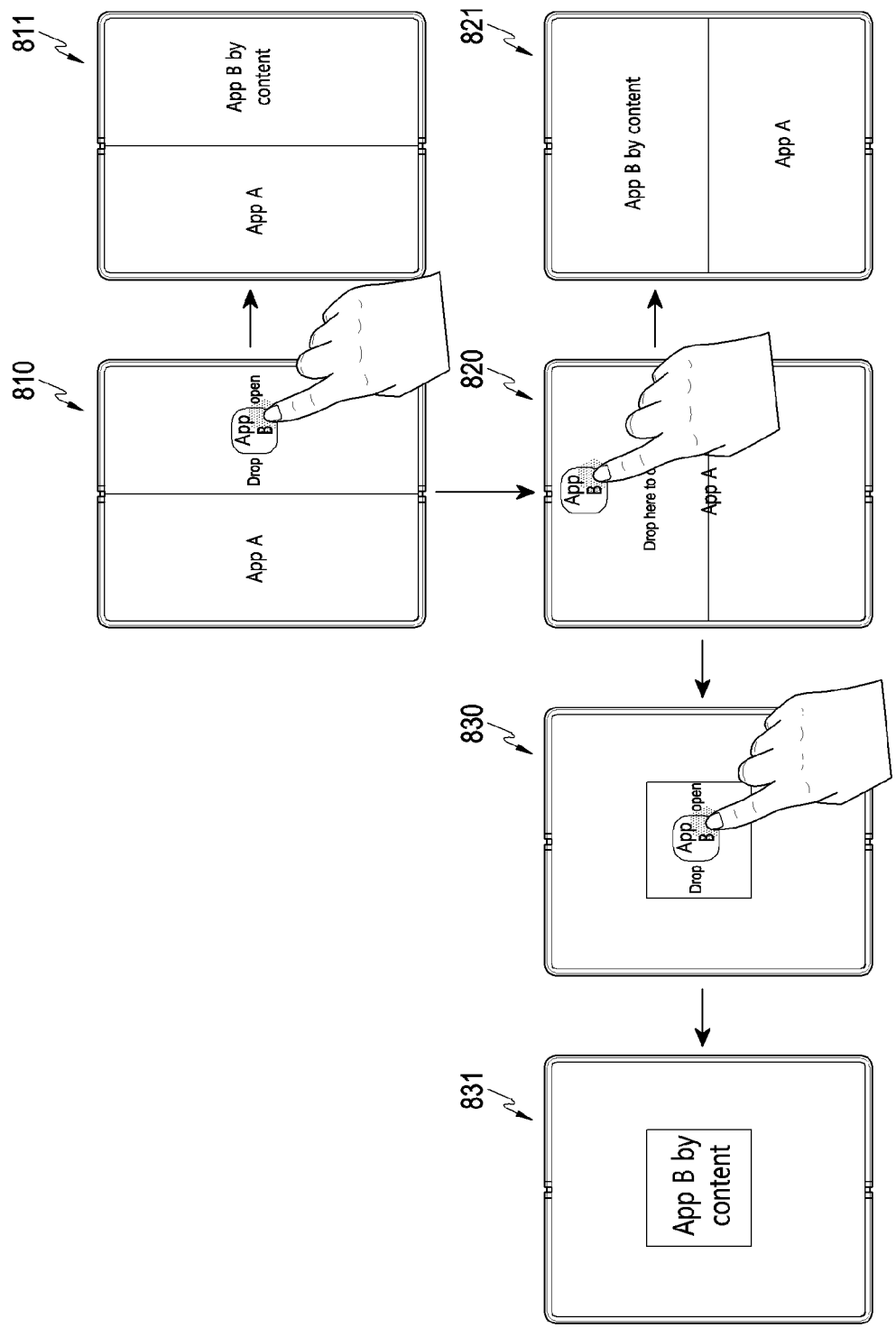
FIG. 8 is a diagram illustrating divided areas based on the positions of drop inputs according to an embodiment of the disclosure.

FIG. 8 is a diagram illustrating divided areas based on the positions of drop inputs according to an embodiment of the disclosure.

Referring to FIG. 8, when the multi-window function is enabled through selection of content included in an execution screen of a first application (e.g., App A) and reception of a drag input, and the drag input is moved to the right on the touch screen (e.g., the display module 160 of FIG. 1), an electronic device (e.g., the electronic device 101 of FIG. 1 or the processor 120 of FIG. 1) may divide the touch screen into left and right areas and display a screen 810 for displaying a guide view indicating that an execution screen of a second application (e.g., App B) related to the content is to be displayed in the right divided area.

According to an embodiment, based on receiving a drop input with the guide view displayed in the right divided area, the electronic device may display a screen 811 that displays the execution screen of the second application in the right divided area and the execution screen of the first application in the left divided area in which the guide view is not displayed.

According to an embodiment, based on receiving a drag input moving upward on the touch screen without a drop input while displaying the screen 810 that displays the guide view indicating that the execution screen of the second application related to the content is to be displayed in the right divided area, the electronic device may divide the touch screen into top and bottom areas and display a screen 820 displaying a guide view indicating that the execution screen of the second application related to the content is to be displayed in a top divided area.

According to an embodiment, based on receiving a drop input with the guide view displayed in the top divided area, the electronic device may display a screen 821 that displays the execution screen of the second application in the top divided area in which the guide view is displayed, and the execution screen of the first application in a bottom divided area in which the guide view is not displayed.

According to an embodiment, based on receiving a drag input moving to a pop-up window area located at the center of the touch screen without a drop input while displaying the screen 820 that displays the guide view indicating that the execution screen of the second application is to be displayed in the top divided area, the electronic device may display a screen 830 displaying a guide view indicating that the execution screen of the second application related to the content is to be displayed in the divided area at the center of the touch screen.

According to an embodiment, based on receiving a drop input with the guide view displayed in the center divided area, the electronic device may display a screen 831 that displays the execution screen of the second application in the center divided area in which the guide view is displayed, and the execution screen of the first application in another area in which the guide view is not displayed.

In this way, the electronic device may provide a guide view that is changed according to movement of a drag input before a drop input, and induce the user to execute the multi-window function in a desired divided area.

Figure 9:
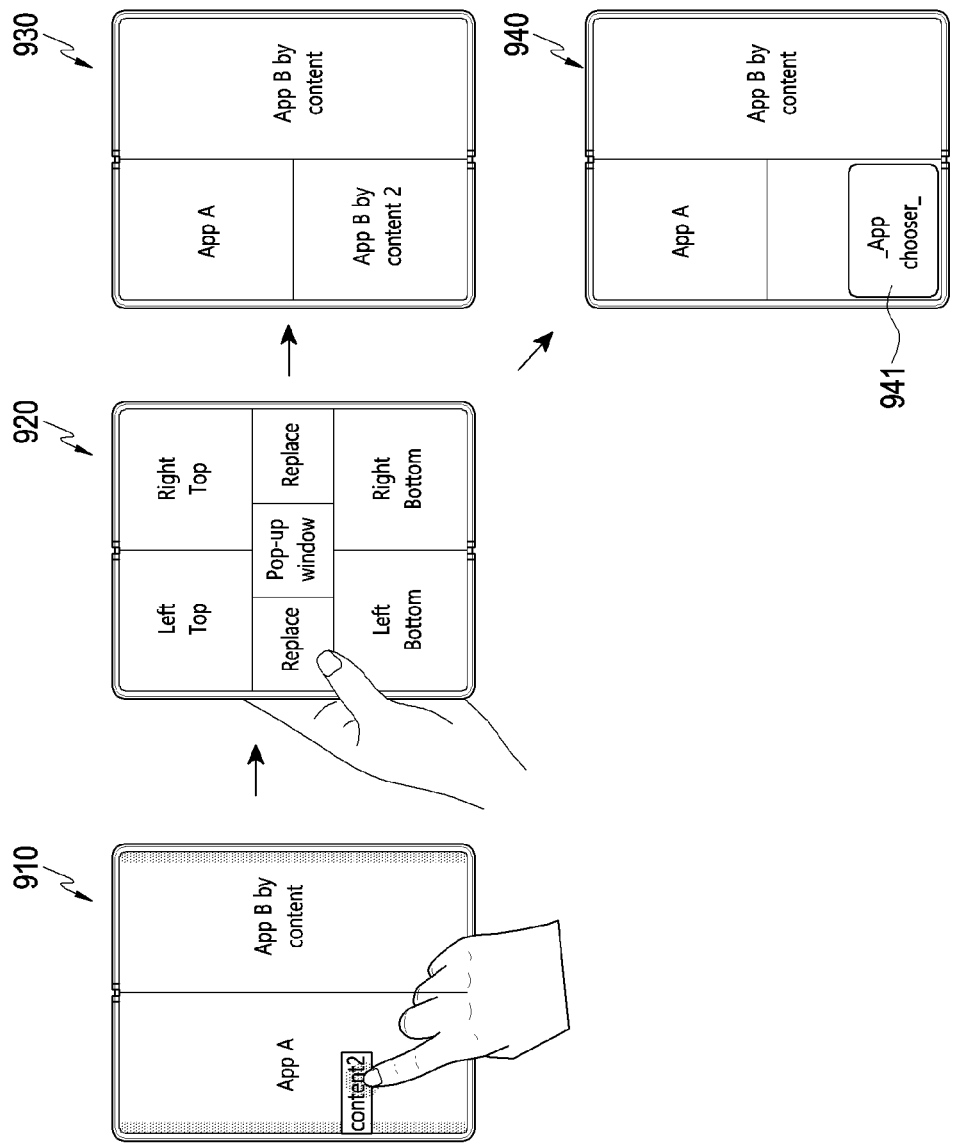
FIG. 9 is a diagram illustrating a multi-window operation including three or more windows according to an embodiment of the disclosure.

FIG. 9 is a diagram illustrating a multi-window operation including three or more windows according to an embodiment of the disclosure.

Referring to FIG. 9, an electronic device (e.g., the electronic device 101 of FIG. 1 or the processor 120 of FIG. 1) may display a screen 910 including a first divided area and a second divided area. For example, an execution screen of a first application (e.g., App A) may be displayed in the first divided area, and an execution screen of a second application (e.g., App B) related to content selected on the execution screen of the first application may be displayed in the second divided area.

According to an embodiment, when the electronic device receives a drag input for second content (e.g., content 2) on the execution screen of the first application, and the drag input moves to an area preset for activating the multi-window function, the electronic device may display a screen 920 that provides drop positions. For example, the screen 920 providing the drop positions may include a pop-up window area, a left top area, a right top area, a left bottom area, a right bottom area, and a replace area. According to an embodiment, when the drag input is moved to the replace area, the first divided area or the second divided area may be replaced with an execution screen of a third application related to the second content. Although the screen is divided into seven areas in FIG. 9, it may be divided into six or fewer areas or eight or more areas. According to an embodiment, the electronic device may skip the operation of displaying the screen 920 providing the drop positions.

According to an embodiment, based on receiving a drop input after the drag input is moved to the left bottom area, the electronic device may vertically divide the first divided area of the first divided area and the second divided area to display a screen 930 including three windows. According to an embodiment, the electronic device may divide the first divided area up and down, and display the execution screen of the first application in a third divided area corresponding to the top area of the first divided area, and display an execution screen of a third application related to second content in a fourth divided area corresponding to the bottom area of the first divided area.

According to an embodiment, when there are a plurality of third applications related to the second content, the electronic device may display a screen 940 that displays a list 941 including the plurality of third applications in the fourth divided area.

Although FIG. 9 illustrates an embodiment in which content included in the execution screen of the first application is selected as the second content, content included in the execution screen of the second application may be selected as the second content.

In addition, although FIG. 9 illustrates an embodiment in which a drop input is received after a drag input is moved to the left bottom area, the execution screen of the third application may be displayed in the top divided area of the first divided area according to a position at which the drop input is received, the second divided area may be divided up and down to display the execution screen of the third application in the top or bottom divided area of the second divided area, the execution screen of the third application may be displayed in the form of a pop-up between the first divided area and the second divided area, or the execution screen of the first application or the execution screen of the second application may be replaced with the execution screen of the third application without an additional dividing.

Figure 10:
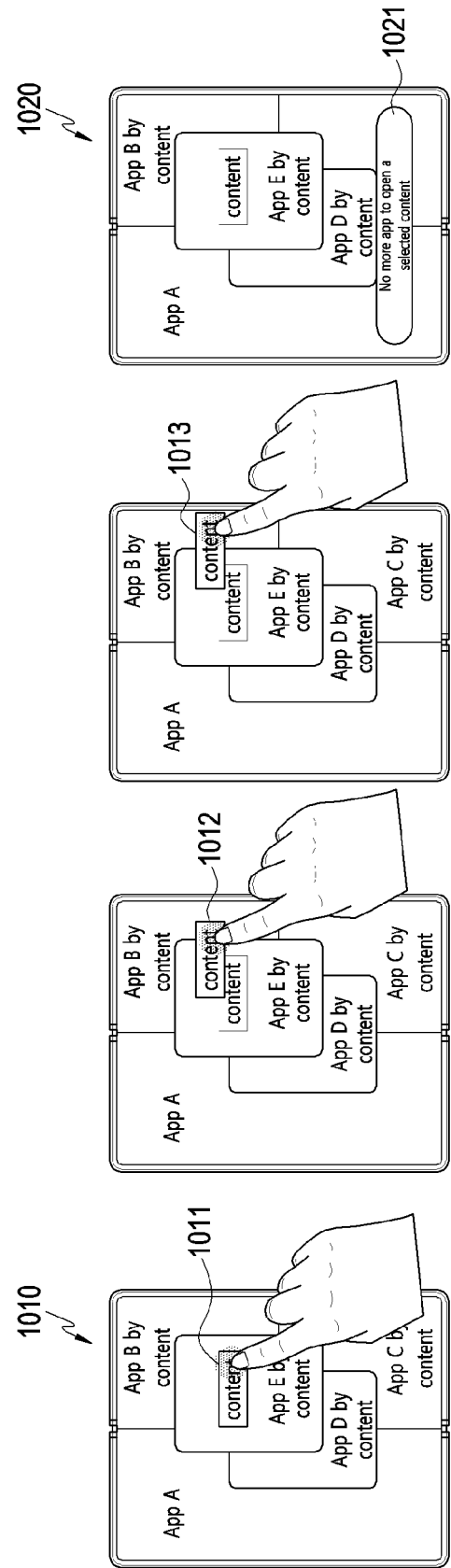
FIG. 10 is a diagram illustrating a multi-window operation including three or more windows according to an embodiment of the disclosure.

FIG. 10 is a diagram illustrating a multi-window operation including three or more windows according to an embodiment of the disclosure.

Referring to FIG. 10, an electronic device (e.g., the electronic device 101 of FIG. 1 or the processor 120 of FIG. 1) may display a screen 1010 including a plurality of execution screens through multiple drag-and-drop inputs. For example, the electronic device may display the screen 1010 including five execution screens through four drag-and-drop inputs, and the five execution screens may be arranged in left, right top and right bottom areas, and two pop-up forms.

According to an embodiment, when the electronic device receives a selection of content 1011 and a drag input for content 1012 included in one of the plurality of execution screens, and the drag input moves to a preset area 1013, the electronic device may identify that the user intends to add a window.

According to an embodiment, when an application related to the content 1012 is already running, the electronic device may display a screen 1020 including a message 1021 "No more application to open a selected content or No more application to be launched."

Figure 11:
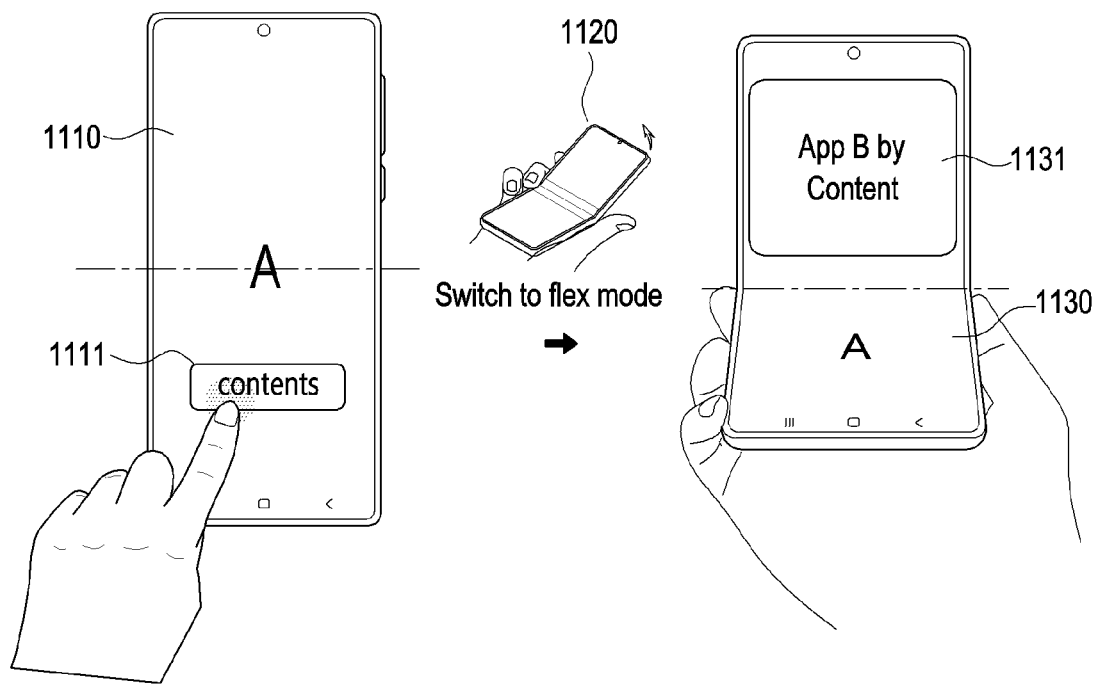
FIG. 11 is a diagram illustrating a multi-window operation in a foldable device according to an embodiment of the disclosure.

FIG. 11 is a diagram illustrating a multi-window operation in a foldable device according to an embodiment of the disclosure.

Referring to FIG. 11, when an electronic device (e.g., the electronic device 101 of FIG. 1 or the processor 120 of FIG. 1) receives a user input that selects content 1111 included in an execution screen 1110 of a first application through a touch or a long touch in a fully unfolded state and transitions to a flex mode 1120 in which a hinge of the electronic device is folded only by half, the electronic device may activate the multi-window function. For example, when the electronic device is switched to the flex mode 1120 after the content 1111 is selected, the electronic device may divide the touch screen up and down with respect to the hinge. According to an embodiment, the electronic device may display an execution screen 1130 of a first application and an execution screen 1131 of a second application related to the content 1111 in respective divided areas, based on a position at which a drop input for the touch or long touch is received, after switching to the flex mode 1120. For example, based on receiving the drop input for the touch or long touch on the content 1111 in a top divided area after switching to the flex mode 1120, the electronic device may display the execution screen 1131 of the second application in the top divided area and the execution screen 1130 of the first application in a bottom divided area.

Figure 12A:
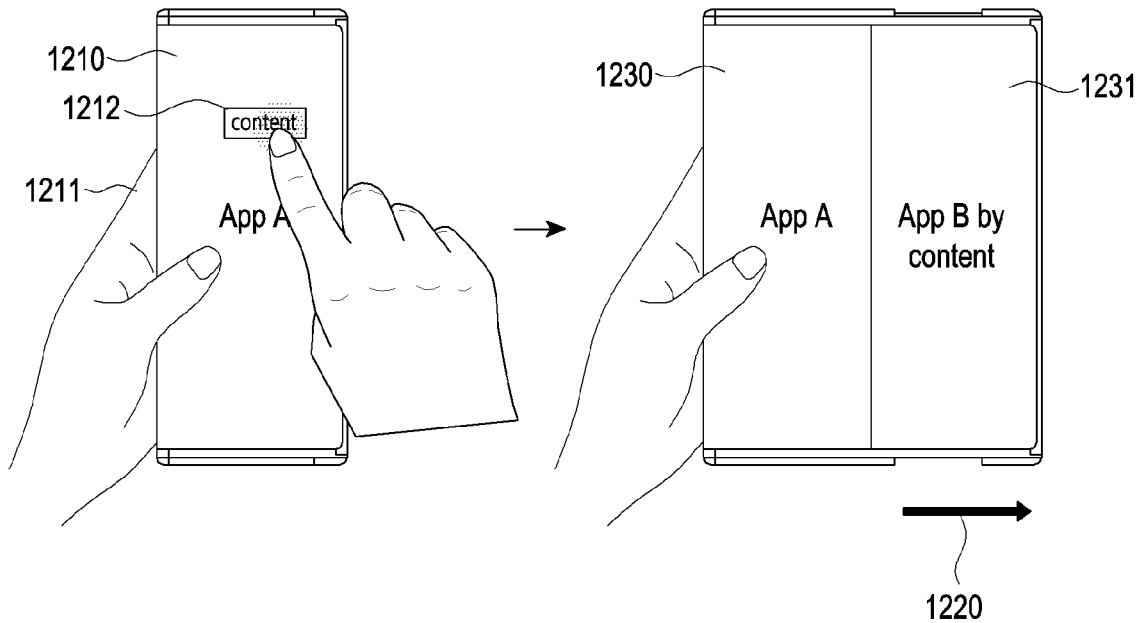
FIG. 12A is a diagram illustrating a multi-window operation in a slidable device according to an embodiment of the disclosure.

FIG. 12A is a diagram illustrating a multi-window operation in a slidable device according to an embodiment of the disclosure. For example, FIG. 12A illustrates an embodiment in which the electronic device is gripped with the left hand.

Figure 12B:
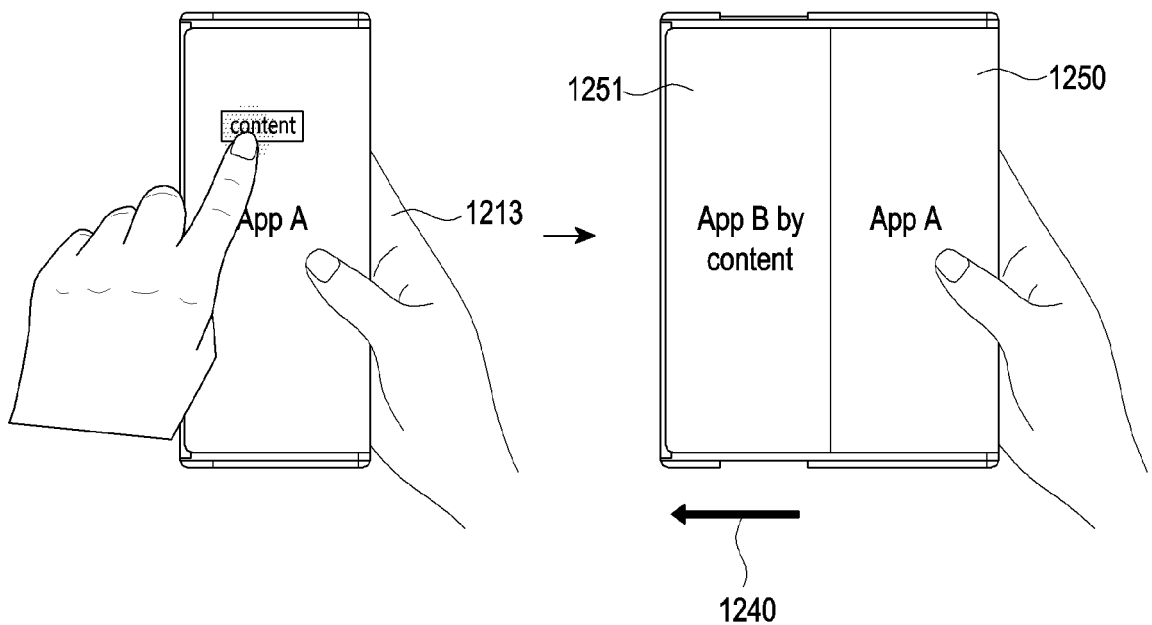
FIG. 12B is a diagram illustrating a multi-window operation in a slidable device according to an embodiment of the disclosure.

FIG. 12B is a diagram illustrating a multi-window operation in a slidable device according to an embodiment of the disclosure. For example, FIG. 12B illustrates an embodiment in which the electronic device is gripped with the right hand.

Referring to FIG. 12A, when content 1212 included in an execution screen 1210 of a first application is selected by a touch or a long touch, and a drag input is moved to a preset area for activating the multi-window function in an electronic device in a shrunken state held with a left hand 1211, the electronic device may extend a touch screen (e.g., the display module 160 of FIG. 1) to the right 1220 based on being gripped by the left hand 1211.

According to an embodiment, the electronic device may display the execution screen of the first application in a left divided area 1230, which is the existing area of the touch screen, and display an execution screen of a second application related to content in a right divided area 1231, which is the extended area of the touch screen.

Referring to FIG. 12B, when content included in an execution screen of a first application is selected by a touch or a long touch, and a drag input is moved to a preset area for activating a multi-window function in an electronic device (e.g., the electronic device 101 of FIG. 1 or the processor 120 of FIG. 1) in a shrunken state held with a right hand 1213, the electronic device may extend a touch screen (e.g., the display module 160 of FIG. 1) to the left 1240, based on being gripped with the right hand 1213.

According to an embodiment, the electronic device may display the execution screen of the first application in a right divided area 1250 which is the existing area of the touch screen, and display an execution screen of a second application related to the content in a left divided area 1251 which is the extended area of the touch screen.

In the slidable electronic device as described above, the execution aspect of the multi-window may vary according to the gripping position.

According to an embodiment, an electronic device (e.g., the electronic device 101 of FIG. 1) may include a touch screen (e.g., the display module 160 of FIG. 1) and at least one processor (e.g., the processor 120 of FIG. 1) operatively coupled to the touch screen. The at least one processor may be configured to display an execution screen of a first application on the touch screen, based on receiving a drag input for one piece of content of a plurality of pieces of content included in the execution screen of the first application, identify whether the drag input moves to a preset area, when the drag input moves to the preset area, identify a second application related to a property of the one piece of content, based on receiving a drop input after the drag input, divide the touch screen based on a position at which the drop input is received, display the execution screen of the first application in a first divided area, and display an execution screen of the second application in a second divided area.

According to an embodiment, the at least one processor may be configured to, based on receiving the drag input for the one piece of content, identify whether the first application supports a multi-window function, and when the multi-window function is supported, identify the property of the one piece of content.

According to an embodiment, the at least one processor may be configured to identify the property of the one piece of content by identifying whether a type of the one piece of content is a multimedia file or text, and when the type of the one piece of content is text, identify the property of the one piece of content by further performing text analysis.

According to an embodiment, the at least one processor may be configured to disable the multi-window function based on a heating state of the electronic device or a charging state of a battery.

According to an embodiment, the at least one processor may be configured to identify the second application for executing or inputting the one piece of content, based on the property of the one piece of content.

According to an embodiment, the at least one processor may be configured to identify one of a search application and a memo application as the second application, in the absence of an application related to the one piece of content.

According to an embodiment, the second application may be identical to the first application.

According to an embodiment, the at least one processor may be configured to, when a plurality of second applications related to the property of the one piece of content are identified, display a list including the plurality of second applications in the second divided area, and when one second application is selected from the list, display an execution screen of the selected second application in the second divided area.

According to an embodiment, the at least one processor may be configured to display a guide view for the second divided area based on the drag input after the drag input moves to the preset area.

According to an embodiment, the at least one processor may be configured to end an operation based on the drag input, in response to receiving a preset user input for canceling the drag input after the drag input moves to the preset area.

According to an embodiment, the at least one processor may be configured to, based on receiving a second drag input for one of a plurality of pieces of second content included in the execution screen of the second application, identify whether the second drag input moves to a second preset area, when the second drag input moves to the second preset area, identify a third application related to a property of the one piece of second content, based on receiving a second drop input after the second drag input, divide the second divided area into a third divided area and a fourth divided area based on a position at which the second drop input is received, display the execution screen of the second application in the third divided area, and display an execution screen of the third application in the fourth divided area.

According to an embodiment, a method of controlling an electronic device (e.g., the electronic device 101 of FIG. 1) may include displaying an execution screen of a first application on a touch screen (e.g., the display module 160 of FIG. 1), based on receiving a drag input for one of a plurality of pieces of content included in the execution screen of the first application, identifying whether the drag input moves to a preset area, when the drag input moves to the preset area, identifying a second application related to a property of the one piece of content, based on receiving a drop input after the drag input, dividing the touch screen based on a position at which the drop input is received, displaying the execution screen of the first application in a first divided area, and displaying an execution screen of the second application in a second divided area.

According to an embodiment, the method may further include based on receiving the drag input for the one piece of content, identifying whether the first application supports a multi-window function, and when the multi-window function is supported, identifying the property of the one piece of content.

According to an embodiment, identifying the property of the one piece of content may include identifying the property of the one piece of content by identifying whether a type of the one piece of content is a multimedia file or text, and when the type of the one piece of content is text, identifying the property of the one piece of content by further performing text analysis.

According to an embodiment, identifying whether the first application supports a multi-window function may include disabling the multi-window function based on a heating state of the electronic device or a charging state of a battery.

According to an embodiment, identifying the second application may include identifying the second application for executing or inputting the one piece of content, based on the property of the one piece of content.

According to an embodiment, identifying the second application may include, in the absence of an application related to the one piece of content, identifying one of a search application and a memo application as the second application.

According to an embodiment, displaying the execution screen of the second application in the second divided area may include, when a plurality of second applications related to the property of the one piece of content are identified, displaying a list including the plurality of second applications in the second divided area, and when one second application is selected from the list, displaying an execution screen of the selected second application in the second divided area.

According to an embodiment, the method may further include, in response to receiving a preset user input for canceling the drag input after the drag input moves to the preset area, ending an operation based on the drag input.

According to an embodiment, the method may further include, based on receiving a second drag input for one of a plurality of pieces of second content included in the execution screen of the second application, identifying whether the second drag input moves to a second preset area, when the second drag input moves to the second preset area, identifying a third application related to a property of the one piece of second content, based on receiving a second drop input after the second drag input, dividing the second divided area into a third divided area and a fourth divided area based on a position at which the second drop input is received, displaying the execution screen of the second application in the third divided area, and displaying an execution screen of the third application in the fourth divided area.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a touch screen;
   one or more processors including processing circuitry; and
   memory storing instructions that, when executed by the one or more processors individually or collectively, cause the electronic device to:
   display, on the touch screen, a first execution screen of a first application, the first execution screen of the first application comprising a plurality of pieces of content of the first application,
   receive a selection of one piece of content included in the first execution screen of the first application among the plurality of pieces of content,
   based on the receiving of the selection of the one piece of content included in the first execution screen of the first application and receiving a drag input for the one piece of content, identify whether the drag input for the one piece of content moves to a preset area of the touch screen, wherein the preset area is one of a plurality of drop positions of the touch screen, wherein the plurality of drop positions are related to displaying a pop-up screen or a plurality of divided screens, based on identifying that the drag input for the one piece of content is moved to the preset area being a drop position related to displaying the pop-up screen, display, in a pop-up form, a guide view and a user interface for cancelling the drag input, based on receiving a drop input of the one piece of content on the guide view, display a second execution screen of the first application as the pop-up screen, and based on receiving a drop input of the one piece of content on the user interface, cancel the drag input.

2. The electronic device of claim 1, wherein the instructions, when executed by the one or more processors individually or collectively, further cause the electronic device to:

display the second execution screen of the first application as overlapping a portion of the first execution screen of the first application.

3. The electronic device of claim 1, wherein the preset area corresponds to a generating of the pop-up screen among a plurality of areas of the touch screen, and wherein the plurality of areas correspond to positions where the second execution screen is generated, respectively.

4. The electronic device of claim 1, wherein the instructions, when executed by the one or more processors individually or collectively, further cause the electronic device to:

based on the receiving of the drag input for the one piece of content, identify whether the first application supports a multi-window function, and based on identifying that the first application supports the multi-window function, identify a property of the one piece of content.

5. The electronic device of claim 4, wherein the instructions, when executed by the one or more processors individually or collectively, further cause the electronic device to:

identify the property of the one piece of content by identifying whether a type of the one piece of content is a multimedia file or text, and based on identifying that the type of the one piece of content is text, identify the property of the one piece of content by further performing text analysis.

6. The electronic device of claim 4, wherein the instructions, when executed by the one or more processors individually or collectively, further cause the electronic device to:

based on a heating state of the electronic device or a charging state of a battery of the electronic device, disable the multi-window function.

7. The electronic device of claim 4, wherein the instructions, when executed by the one or more processors individually or collectively, further cause the electronic device to:

based on the property of the one piece of content, identify the first application for executing or inputting the one piece of content.

8. The electronic device of claim 4, wherein the instructions, when executed by the one or more processors individually or collectively, further cause the electronic device to:

based on identifying a plurality of applications including the first application, related to the property of the one piece of content, display a list including the plurality of applications in the pop-up screen, and based on the first application being selected from the list, display the second execution screen of the first application in the pop-up screen.

9. The electronic device of claim 1, wherein the instructions, when executed by the one or more processors individually or collectively, further cause the electronic device to:

based on a drag input moving to another drop position after the drag input moves to the preset area, display a second guide view corresponding to the another drop position.

10. The electronic device of claim 1, wherein the instructions, when executed by the one or more processors individually or collectively, further cause the electronic device to:

in response to receiving a preset user input for canceling the drag input after the drag input moves to the preset area, end an operation associated with the drag input.

11. A method performed by an electronic device, the method comprising:

displaying, by the electronic device on a touch screen, a first execution screen of a first application, the first execution screen of the first application comprising a plurality of pieces of content of the first application;

receiving, by the electronic device, a selection of one piece of content included in the first execution screen of the first application among the plurality of pieces of content;

based on the receiving of the selection of the one piece of content included in the first execution screen of the first application and receiving a drag input for the one piece of content, identifying, by the electronic device, whether the drag input moves to a preset area of the touch screen, wherein the preset area is one of a plurality of drop positions of the touch screen, wherein the plurality of drop positions are related to displaying a pop-up screen or a plurality of divided screens;

based on identifying that the drag input for the one piece of content is moved to the preset area being a drop position related to displaying the pop-up screen, displaying, by the electronic device in a pop-up form, a guide view and a user interface for cancelling the drag input;

based on receiving a drop input of the one piece of content on the guide view, displaying, by the electronic device, a second execution screen of the first application as the pop-up screen; and based on receiving a drop input of the one piece of content on the user interface, cancelling, by the electronic device, the drag input.

12. The method of claim 11, wherein the displaying of the second execution screen comprises:

displaying, by the electronic device, the second execution screen of the first application as overlapping a portion of the first execution screen of the first application.

13. The method of claim 11, wherein the preset area corresponds to a generating of the pop-up screen among a plurality of areas of the touch screen, and wherein the plurality of areas correspond to positions where the second execution screen is generated, respectively.

14. The method of claim 11, further comprising:

based on the receiving of the drag input for the one piece of content, identifying, by the electronic device, whether the first application supports a multi-window function; and based on identifying that the first application supports the multi-window function, identifying, by the electronic device, a property of the one piece of content.

15. The method of claim 14, wherein the identifying of the property of the one piece of content comprises:
  identifying, by the electronic device, the property of the one piece of content by identifying whether a type of the one piece of content is a multimedia file or text; and
  based on identifying that the type of the one piece of content is text, identifying, by the electronic device, the property of the one piece of content by further performing text analysis.

16. The method of claim 14, wherein the identifying of whether the first application supports the multi-window function comprises:
  disabling, by the electronic device, the multi-window function based on a heating state of the electronic device or a charging state of a battery of the electronic device.

17. The method of claim 14, further comprising:
  based on the property of the one piece of content, identifying, by the electronic device, the first application for executing or inputting the one piece of content.

18. The method of claim 12, wherein the displaying of the second execution screen of the first application comprises:
  based in identifying a plurality of applications including the first application, related to a property of the one piece of content, displaying, by the electronic device, a list including the plurality of applications in the pop-up screen; and
  based on the first application being selected from the list, displaying, by the electronic device, the second execution screen of the first application in the pop-up screen.

19. The method of claim 12, further comprising:
  in response to receiving a preset user input for canceling the drag input after the drag input moves to the preset area, ending, by the electronic device, an operation associated with the drag input.

20. One or more non-transitory computer-readable storage media storing one or more computer programs including computer-executable instructions that, when executed by one or more processors of an electronic device individually or collectively, cause the electronic device to perform operations, the operations comprising:
  displaying, by the electronic device on a touch screen, a first execution screen of a first application, the first execution screen of the first application comprising a plurality of pieces of content of the first application;
  receiving, by the electronic device, a selection of one piece of content included in the first execution screen of the first application among the plurality of pieces of content;
  based on the receiving of the selection of the one piece of content included in the first execution screen of the first application and receiving a drag input for the one piece of content, identifying, by the electronic device, whether the drag input for the one piece of content moves to a preset area of the touch screen, wherein the preset area is one of a plurality of drop positions of the touch screen, wherein the plurality of drop positions are related to displaying a pop-up screen or a plurality of divided screens;
  based on identifying that the drag input for the one piece of content is moved to the preset area being a drop position related to displaying the pop-up screen, displaying, by the electronic device in a pop-up form, a guide view and a user interface for cancelling the drag input;
  based on receiving a drop input of the one piece of content on the guide view, displaying, by the electronic device, a second execution screen of the first application as the pop-up screen; and
  based on receiving a drop input of the one piece of content on the user interface, cancelling, by the electronic device, the drag input.

* * * * *